(12) United States Patent
Tsai

(10) Patent No.: US 12,377,926 B2
(45) Date of Patent: Aug. 5, 2025

(54) TELESCOPIC MECHANISM

(71) Applicant: Giant Manufacturing Co., Ltd., Taichung (TW)

(72) Inventor: Tsung-Mu Tsai, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 172 days.

(21) Appl. No.: 18/457,294

(22) Filed: Aug. 28, 2023

(65) Prior Publication Data

US 2024/0067289 A1 Feb. 29, 2024

(30) Foreign Application Priority Data

Aug. 29, 2022 (TW) ................................. 111209358

(51) Int. Cl.
*B62J 1/08* (2006.01)
*B62K 19/36* (2006.01)

(52) U.S. Cl.
CPC ................ *B62J 1/08* (2013.01); *B62K 19/36* (2013.01); *B62J 2001/085* (2013.01)

(58) Field of Classification Search
CPC ....... B62J 1/08; B62J 2001/085; B62K 19/36; B62K 19/30
USPC ..................................................... 248/125.8
See application file for complete search history.

(56) References Cited

U.S. PATENT DOCUMENTS

| | | | |
|---|---|---|---|
| 3,215,383 A | 11/1965 | Wright | |
| 8,814,109 B2 * | 8/2014 | Laird | B62J 1/08 |
| | | | 297/215.14 |
| 8,894,025 B2 * | 11/2014 | Wehage | B62J 1/06 |
| | | | 403/109.1 |
| 9,422,018 B2 * | 8/2016 | Pelot | G05D 7/0635 |
| 9,688,331 B1 * | 6/2017 | Shirai | B62J 1/08 |
| 10,246,155 B2 * | 4/2019 | McAndrews | B62K 19/36 |
| 10,322,762 B2 * | 6/2019 | Shirai | B62J 1/08 |
| 10,562,578 B2 * | 2/2020 | Teixeira | B62K 19/36 |

(Continued)

FOREIGN PATENT DOCUMENTS

| | | |
|---|---|---|
| CN | 105292314 | 2/2016 |
| EP | 0663314 | 7/1995 |

(Continued)

OTHER PUBLICATIONS

"Search Report of Europe Counterpart Application", issued on Jan. 3, 2024, p. 1-p. 8.

*Primary Examiner* — Nkeisha Smith
(74) *Attorney, Agent, or Firm* — JCIPRNET

(57) ABSTRACT

A telescopic mechanism includes a top tube, a bottom tube, a supporting tube, at least one stroke tube, at least one first positioning tube, at least one second positioning tube, and a control assembly. The bottom tube is slidably disposed around the top tube. The supporting tube is disposed in the top tube. The at least one first positioning tube and the at least one second positioning tube are disposed in the top tube. The control assembly is connected to the bottom tube and has a positioning base. The positioning base is movably disposed in the at least one stroke tube, the at least one first positioning tube, and the at least one second positioning tube. When the positioning base is fastened with the at least one first positioning tube, the top tube is moved toward a first direction relative to the bottom tube to form a first length.

12 Claims, 7 Drawing Sheets

(56) References Cited

U.S. PATENT DOCUMENTS

| | | | | |
|---|---|---|---|---|
| 10,689,049 B2* | 6/2020 | Chiesa | ................... | B62K 19/36 |
| 10,974,781 B2 | 4/2021 | Staples | | |
| 12,151,757 B2* | 11/2024 | Ahnert | ....................... | B62J 1/06 |
| 2012/0006949 A1* | 1/2012 | Laird | ........................ | F16C 1/12 |
| | | | | 248/161 |
| 2015/0183475 A1* | 7/2015 | McAndrews | .......... | B62K 19/18 |
| | | | | 280/287 |
| 2019/0039669 A1* | 2/2019 | McAndrews | ......... | F16B 7/1409 |
| 2019/0185090 A1* | 6/2019 | McAndrews | ......... | F16B 7/1409 |

FOREIGN PATENT DOCUMENTS

| | | |
|---|---|---|
| TW | I562928 | 12/2016 |
| WO | 9623161 | 8/1996 |
| WO | 2011072325 | 6/2011 |

\* cited by examiner

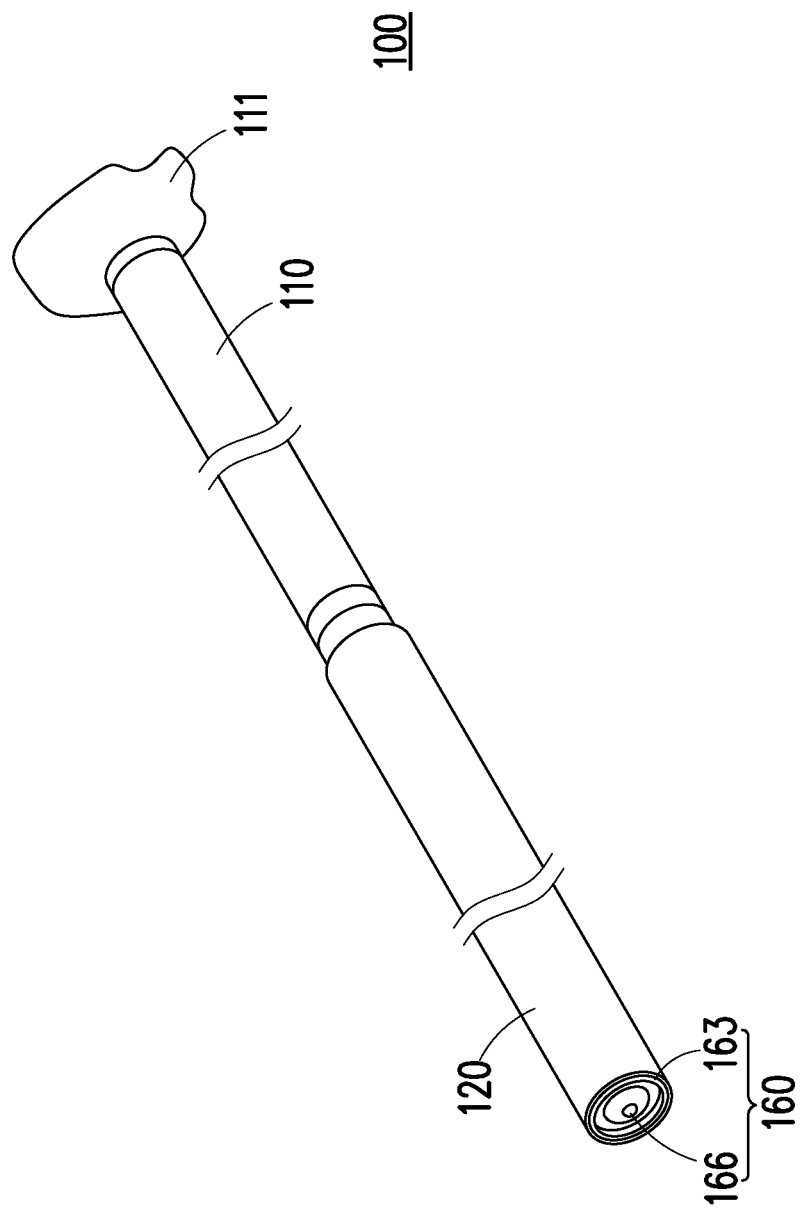

TELESCOPIC MECHANISM

CROSS-REFERENCE TO RELATED APPLICATION

This application claims the priority benefit of Taiwan application serial no. 111209358, filed on Aug. 29, 2022. The entirety of the above-mentioned patent application is hereby incorporated by reference herein and made a part of this specification.

BACKGROUND

Technical Field

The present disclosure relates to a structure for adjusting seat height, and in particular relates to a telescopic mechanism.

Description of Related Art

The existing oil-hydraulic telescopic seat tube used in bicycles is continuously adjustable, which means that the telescopic length of telescopic seat tube may be adjusted freely. Although the user has a high degree of freedom of adjustment, the relative cost is too high. For most users, in addition to the height for riding, the telescopic seat tube also requires to have the height for parking. Through the adjustment of the height of parking, the user is able to lower the height when parking and thus improve safety with both feet touching the ground. Although the existing hydraulic telescopic seat tube may be adjusted steplessly, the design does not show the user of the exact position for adjustment. As a result, the adjustment of height is not intuitive enough, and errors are likely to occur when the user makes adjustment between height for riding and height for parking. Moreover, high price hinders most consumers from enjoying a safer riding experience.

In light of the foregoing, a telescopic seat tube adjustable with a simplified adjustment method has been developed. The telescopic seat tube allows the user to easily adjust the heights for parking and riding without making errors, and is adaptable to most bicycles. The present disclosure may further provide multi-stage adjustment options on low-cost conditions, is adaptable to different riders, for example, different family members may set their own heights for riding on the telescopic seat tube.

SUMMARY

This disclosure provides a telescopic mechanism, which has a multi-step stroke adjustment function, and is able to adjust the telescopic length of the telescopic mechanism according to requirements.

The telescopic mechanism of the disclosure includes a top tube, a bottom tube, a supporting tube, at least one stroke tube, at least one first positioning tube, at least one second positioning tube, and a control assembly. The bottom tube is slidably disposed around the top tube. The supporting tube is disposed in the top tube. The at least one stroke tube is disposed in the top tube and spaced part from the supporting tube. The at least one first positioning tube is disposed in the top tube and abuts against one end of the at least one stroke tube. The at least one second positioning tube is disposed in the top tube and abuts against the other end of the at least one stroke tube. The control assembly is connected to the bottom tube and has a positioning base. The positioning base is movably disposed in the at least one stroke tube, the at least one first positioning tube, and the at least one second positioning tube. When the positioning base is fastened with the at least one first positioning tube, the top tube is moved toward a first direction relative to the bottom tube to form a first length. When the positioning base is fastened with the at least one second positioning tube, the top tube is moved toward a second direction opposite to the first direction relative to the bottom tube to form a second length.

Based on the above, the telescopic mechanism of the present disclosure combines the control assembly, the at least one stroke tube, the first positioning tube and the second positioning tube, and the control assembly is suitable for moving in the at least one stroke tube to engage with the first positioning tube or the second positioning tube, so as to adjust the telescopic length of the top tube relative to the bottom tube. Since the control assembly may only be engaged with the first positioning tube or the second positioning tube, it is possible to ensure that the telescopic mechanism is able to be accurately switched between the first length and the second length, so as to avoid errors in the adjustment process.

Furthermore, the telescopic mechanism of the present disclosure is suitable for the seat of a bicycle, which is switched to the first length in the riding situation to raise the height of the seat, and switched to the second length in the parking situation to lower the height of the seat.

BRIEF DESCRIPTION OF THE DRAWINGS

FIG. 1A is a three-dimensional schematic diagram of a telescopic mechanism of an embodiment of the disclosure.

DESCRIPTION OF THE EMBODIMENTS

Figure 1B:
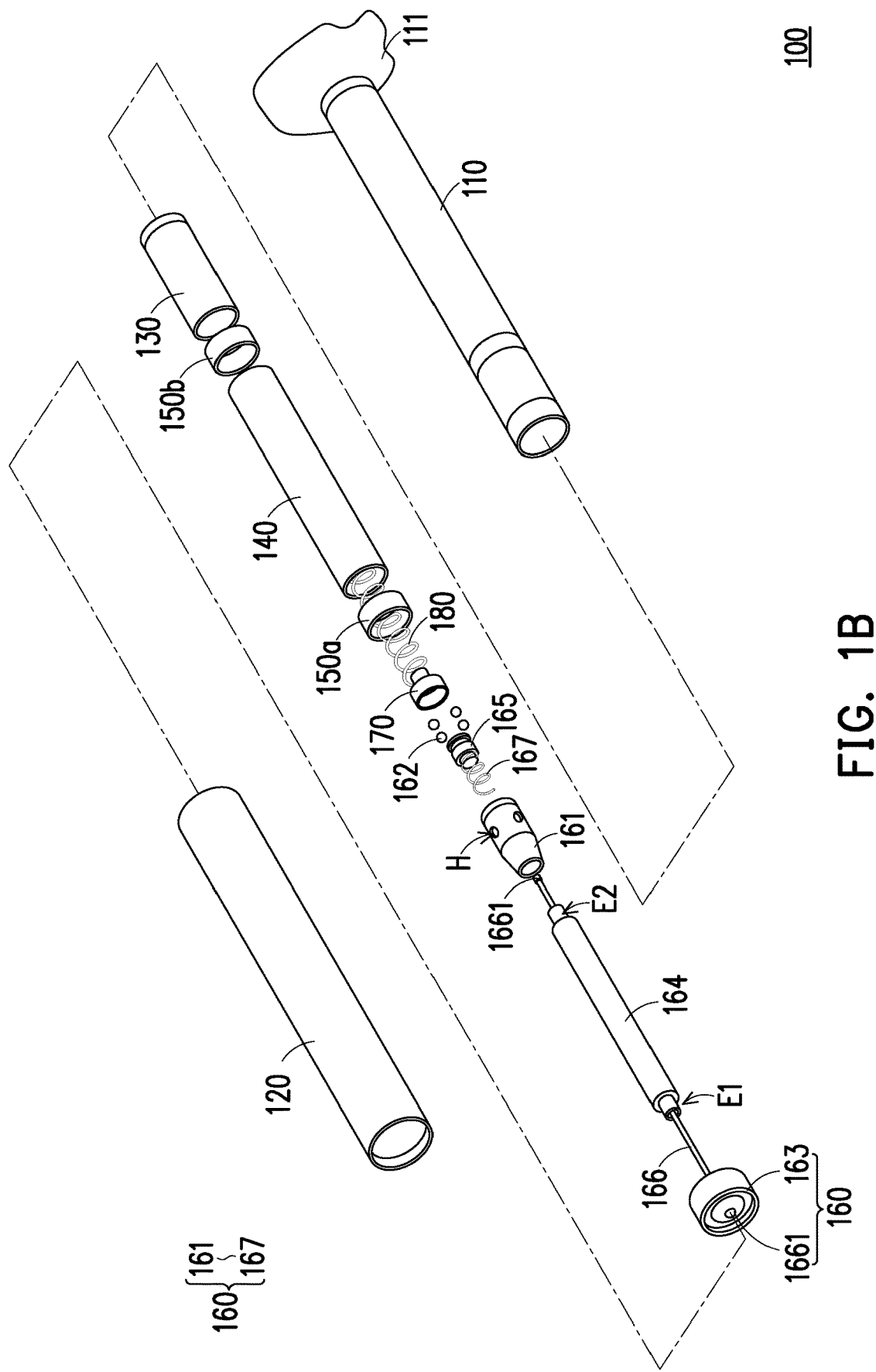
FIG. 1B is an exploded schematic diagram of components of the telescopic mechanism of FIG. 1A.
Figure 2A:
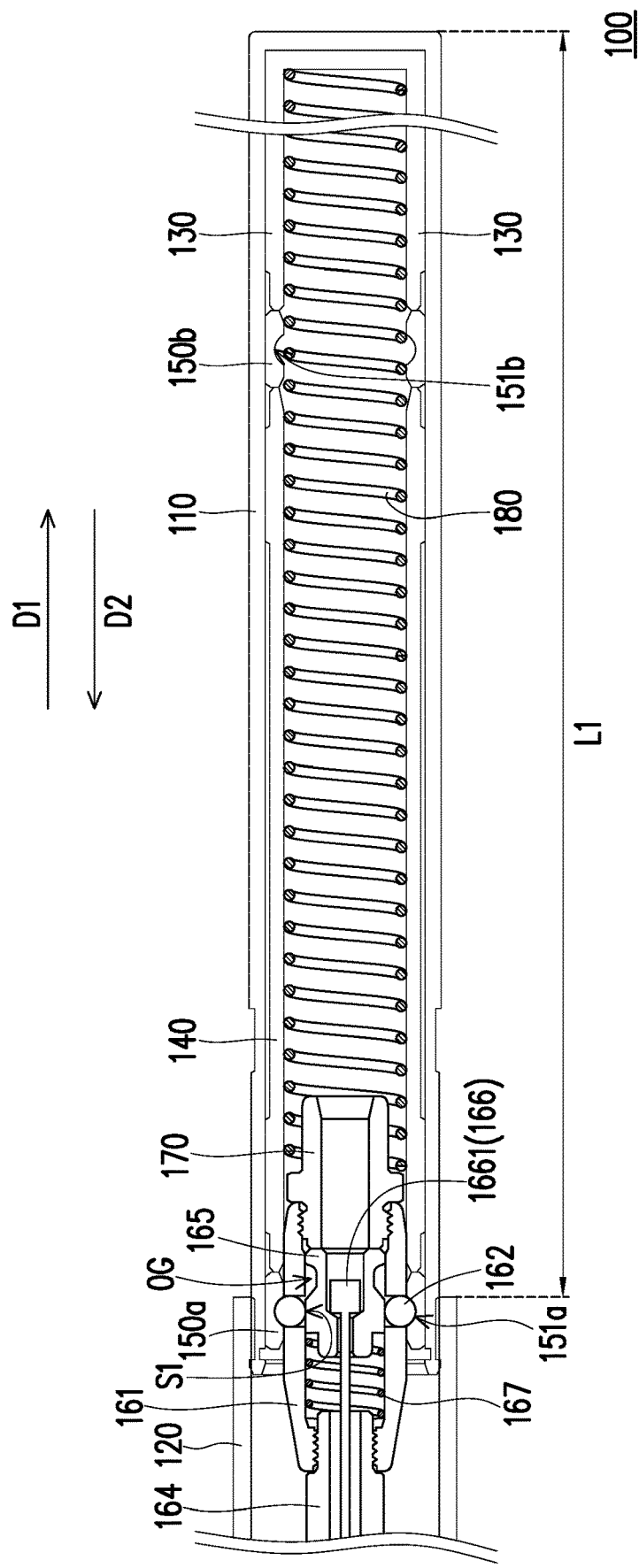
FIG. 2A is a schematic partial cross-sectional diagram of the telescopic mechanism in FIG. 1A switched to a first length.
Figure 2C:
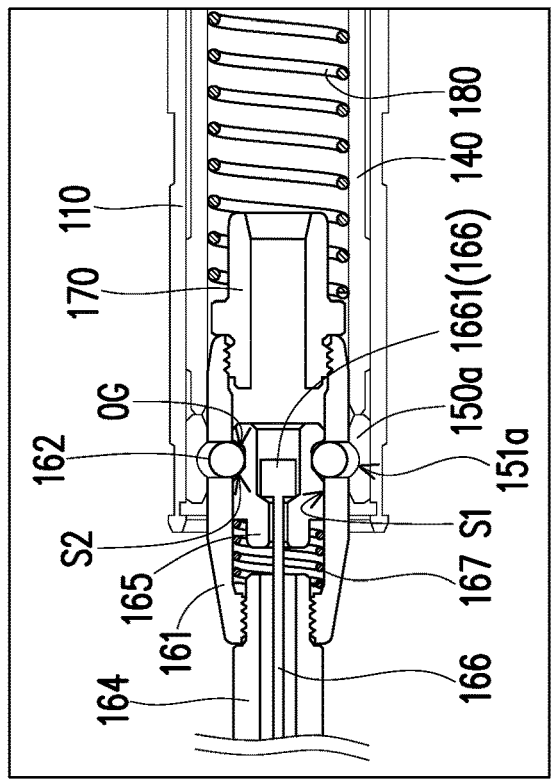
FIG. 2B to FIG. 2C are schematic diagrams showing the action of unlocking a control assembly in FIG. 2A from a positioning tube.
Figure 2B:
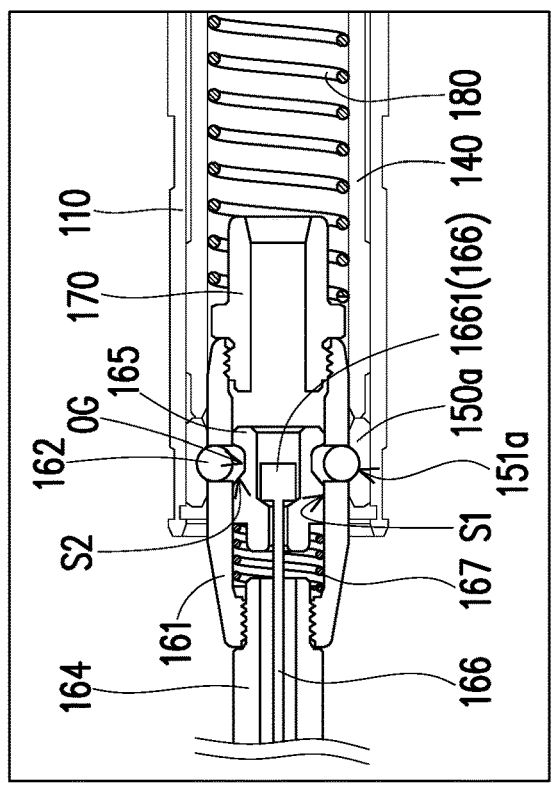
Figure 2D:
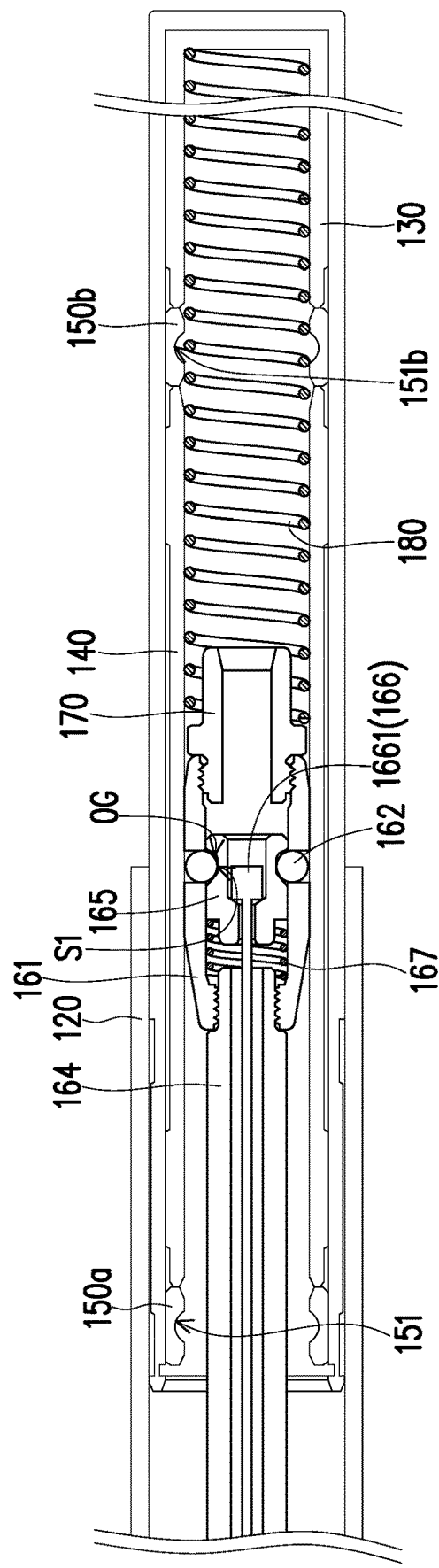
FIG. 2D is a schematic diagram of the control assembly of FIG. 2C moving to the stroke tube.
Figure 2E:
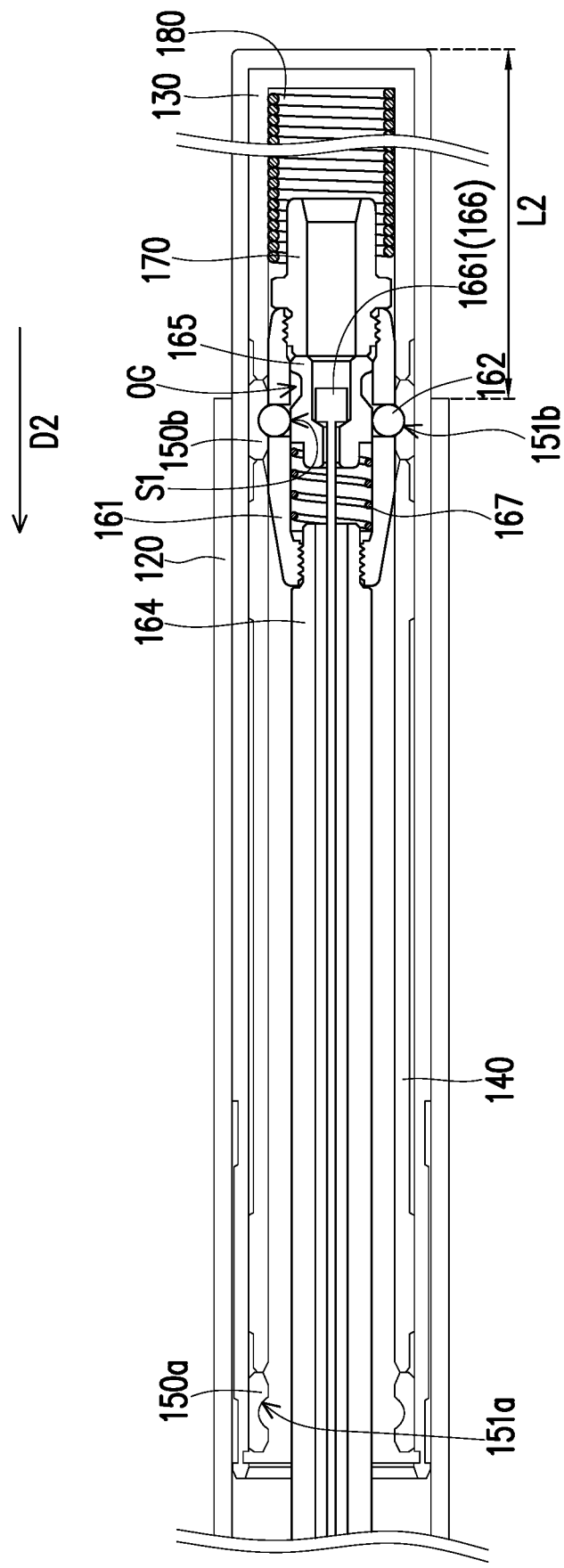
FIG. 2E is a schematic partial cross-sectional diagram of the telescopic mechanism in FIG. 2A switched to a second length.

FIG. 1A is a three-dimensional schematic diagram of a telescopic mechanism of an embodiment of the disclosure. FIG. 1B is an exploded schematic diagram of components of the telescopic mechanism of FIG. 1A. FIG. 2A is a schematic partial cross-sectional diagram of the telescopic mechanism in FIG. 1A switched to a first length. FIG. 2B to FIG. 2C are schematic diagrams showing the action of unlocking a control assembly in FIG. 2A from a positioning tube. FIG. 2D is a schematic diagram of the control assembly of FIG. 2C moving to the stroke tube. FIG. 2E is a schematic partial cross-sectional diagram of the telescopic mechanism in FIG. 2A switched to a second length.

With reference to FIG. 1A and FIG. 1B, the telescopic mechanism 100 of the present disclosure is suitable for the seat of a bicycle, and the height of the seat may be raised to switch to the riding mode. The height of seat may also be lowered to switch to parking mode. In addition, the telescopic mechanism 100 of the present disclosure adopts a mechanical structure to achieve the purpose of precisely switching between the riding mode and the parking mode, and further reducing the cost.

The telescopic mechanism 100 includes a top tube 110, a bottom tube 120, a supporting tube 130, at least one stroke tube 140, at least one first positioning tube 150a, at least one second positioning tube 150b and a control assembly 160.

The bottom tube 120 is slidably disposed around the top tube 110, and the top tube 110 has a connecting base 111 disposed at one end of the top tube 110 away from the bottom tube 120, and the connecting base 111 is configured to mount a bicycle seat.

The supporting tube 130 is disposed in the top tube 110. Specifically, the supporting tube 130 is in surface contact with the inner surface of the top tube 110. The at least one stroke tube 140 is disposed in the top tube 110 and spaced apart from the supporting tube 130. The at least one first positioning tube 150a is disposed in the top tube 110 and abuts against one end of the at least one stroke tube 140, and the at least one second positioning tube 150b is disposed in the top tube 110 and abuts against the other end of the at least one stroke tube 140.

In detail, in the embodiment shown in FIG. 1A to FIG. 2A, there is one stroke tube 140, and the first positioning tube 150a and the second positioning tube 150b are stacked at both ends of the stroke tube 140. The first positioning tube 150a is adjacent to the opening of the top tube 110, and a second positioning tube 150b is located between the supporting tube 130 and the stroke tube 140. The control assembly 160 is connected to the bottom tube 120 and has a positioning base 161. The positioning base 161 is movably disposed in the at least one stroke tube 140, the first positioning tube 150a and the second positioning tube 150b.

Referring to FIG. 1A and FIG. 2A, when the positioning base 161 is engaged with the first positioning tube 150a, the top tube 110 moves toward a first direction D1 relative to the bottom tube 120 to form a first length L1. In the case where the top tube 110 is extended to the first length L1 relative to the bottom tube 120, the length is suitable for the riding mode of the bicycle. Referring to FIG. 2E, when the positioning base 161 is engaged with the second positioning tube 150b, the top tube 110 moves toward a second direction D2 opposite to the first direction D1 relative to the bottom tube 120 to form a second length L2. In the case where the top tube 110 shrinks to the second length L2 relative to the bottom tube 120, the length is suitable for the parking mode of the bicycle.

Furthermore, the number of stroke tubes and positioning tubes may be adjusted according to requirements. For example, in the case where two stroke tubes and three positioning tubes are adopted, they are stacked in sequence, the positioning base is selectively engaged with one of the three positioning tubes, so that there are three extension lengths between the top tube and the bottom tube. In addition, other than stroke tubes and positioning tubes, tubes with other functions may also be stacked, such as elastic tubes to improve shock absorption or rigid tubes to increase structural strength. Moreover, the length of the stroke tube may be selected depends on the needs, so as to adapt to different distances.

Referring to FIG. 1A, FIG. 2A and FIG. 2E, the telescopic mechanism 100 includes a protrusion 170 and a restoring elastic member 180. The protrusion 170 is fixed on the positioning base 161 and faces the supporting tube 130, and the protrusion 170 is screwed to the positioning base 161. The restoring elastic member 180 is disposed in at least one stroke tube 140 and the supporting tube 130 and pushes against the protrusion 170 and a bottom surface of the supporting tube 130 respectively. In the initial state, the restoring elastic member 180 pushes the protrusion 170 and the positioning base 161 to move toward the second direction D2 relative to the at least one stroke tube 140, so that the positioning base 161 is engaged with the first positioning tube 150a or the second positioning tube 150b.

Referring to FIG. 2A, when the top tube 110 is stretched to a first length L1 relative to the bottom tube 120, the restoring elastic member 180 completely releases the elastic force. Referring to FIG. 2E, in the case where the top tube 110 shrinks to the second length L2 relative to the bottom tube 120, the restoring elastic member 180 is deformed due to being pressed by the protrusion 170.

Referring to FIG. 1B and FIG. 2A, the control assembly 160 includes a plurality of balls 162, a fixed base 163, a connecting rod 164, an inner push block 165, a cable 166 and an elastic member 167.

With reference to FIG. 2B and FIG. 2C, a plurality of balls 162 are movably disposed in a plurality of holes H of the positioning base 161. The fixed base 163 is engaged with one end of the bottom tube 120 opposite to the top tube 110. The connecting rod 164 has a first end E1 and a second end E2, the first end E1 is connected to the fixed base 163, and the second end E2 is connected to the positioning base 161. The inner push block 165 is movably disposed in the positioning base 161 and contacts the plurality of balls 162. The cable 166 is movably disposed on the positioning base 161 and the connecting rod 164 and engaged with the inner push block 165. The cable 166 is adapted to drive the inner push block 165 to move toward the second direction D2 relative to the positioning base 161. The elastic member 167 is disposed on the positioning base 161 and surrounds the connecting rod 164 and the cable 166, and both ends of the elastic member 167 abut against the positioning base 161 and the inner push block 165 respectively.

Furthermore, one end of the cable 166 has a cylinder 1661, and the cylinder 1661 is disposed in the inner push block 165, and the cable 166 is pulled to drive the cylinder 1661 to drive the inner push block 165 to move relative to the positioning base 161.

Referring to FIG. 2A to FIG. 2C, the inner push block 165 has a supporting surface S1, an annular groove OG and a guiding surface S2. The supporting surface S1 contacts the inner surface of the positioning base 161, the annular groove OG is formed on the periphery of the inner push block 165 and adjacent to the supporting surface S1, and the guiding surface S2 is formed between the annular groove OG and the supporting surface S1.

Referring to FIG. 2A, the elastic member 167 is adapted to push the inner push block 165 to move toward the first direction D1 relative to the positioning base 161, so that the supporting surface S1 of the inner push block 165 is aligned with the plurality of holes H of the positioning base 161, and the plurality of balls 162 are positioned between the first positioning tube 150a and the plurality of holes H. The first positioning tube 150a has a plurality of first positioning grooves 151a, and the plurality of balls 162 are partially entered the plurality of first positioning grooves 151a by the pushing of the supporting surface S1, so that the positioning base 161 is engaged with the first positioning tube 150a. In addition, the positioning base 161 and the first positioning tube 150a are engaged with each other through the plurality of balls 162 so they are not loosened.

Referring to FIG. 2B and FIG. 2C, the cable 166 is adapted to drive the inner push block 165 to move toward the second direction D2 relative to the positioning base 161, so that the inner push block 165 moves away from the protrusion 170. The annular groove OG of the inner push block 165 is aligned with the plurality of holes H of the positioning base 161, so that the plurality of balls 162 loose from the plurality of first positioning grooves 151a of the first positioning tube 150a, and the plurality of balls 162 are partially entered the annular groove OG of the inner push block 165 and detach from the corresponding positioning tube 150. In this state, the engagement relation between the positioning base 161 and the first positioning tube 150a has been released.

Next, referring to FIG. 2D, the connecting rod 164 may drive the positioning base 161 to move in the stroke tube 140, the first positioning tube 150a and the second positioning tube 150b, or push the top tube 110 to drive the stroke tube 140, the first positioning tube 150a and the second positioning tube 150b to move relative to the positioning base 161. The positioning base 161 is adapted to move relatively along the stroke tube 140. In detail, referring to FIG. 2D, the positioning base 161 is adapted to move toward the first direction D1 to align with the first positioning tube 150a (see FIG. 2E), or move toward the second direction D2 to align with the second positioning tube 150b (see FIG. 2A).

With reference to FIG. 2C and FIG. 2A, when the positioning base 161 moves close to the first positioning tube 150a, the plurality of holes H of the positioning base 161 is aligned with the plurality of first positioning grooves 151a of the first positioning tube 150a, and the plurality of balls 162 are located in the plurality of holes H and the annular groove OG of the inner push block 165. Under the circumstances, the cable 166 is released to restore the elasticity of the elastic member 167 and push the inner push block 165 to move toward the first direction D1 relative to the positioning base 161, so that the inner push block 165 abuts against the protrusion 170. In the meantime, the plurality of balls 162 are pushed from the annular groove OG into the plurality of first positioning grooves 151a of the first positioning tube 150a through the guiding surface S2, so that the positioning base 161 is engaged with the first positioning tube 150a.

Referring to FIG. 2D and FIG. 2E, when the positioning base 161 moves close to the second positioning tube 150b, the plurality of holes H of the positioning base 161 are aligned with the plurality of second positioning grooves 151b of the first positioning tube 150a, and the plurality of balls 162 are located in the plurality of holes H and the annular groove OG of the inner push block 165. Under the circumstances, the cable 166 is released to restore the elasticity of the elastic member 167 and push the inner push block 165 to move toward the first direction D1 relative to the positioning base 161, so that the inner push block 165 abuts against the protrusion 170. In the meantime, the plurality of balls 162 are pushed from the annular groove OG into the plurality of second positioning grooves 151b of the second positioning tube 150b through the guiding surface S2, so that the positioning base 161 is engaged with the second positioning tube 150b (the moving process of the balls is the same as that shown in the FIG. 2C and FIG. 2A).

Figure 3:
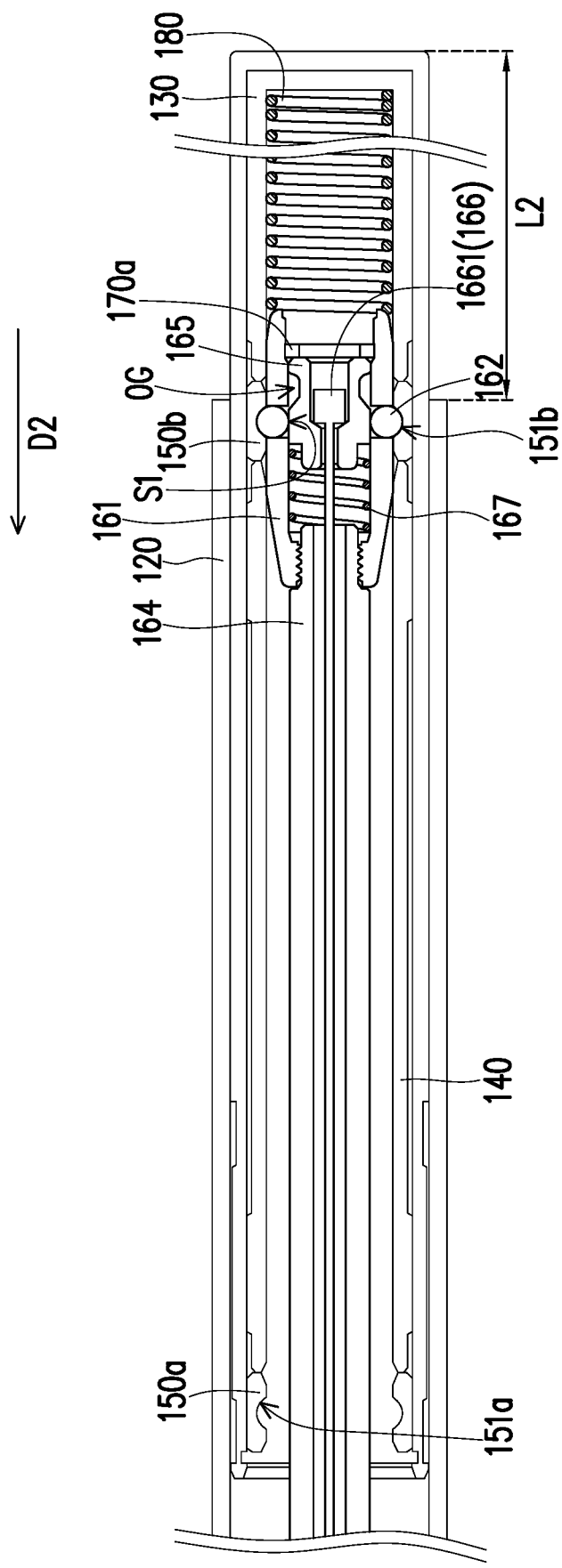
FIG. 3 is a schematic partial cross-sectional diagram of a telescopic mechanism of another embodiment of the disclosure.

Referring to FIG. 3, in another embodiment, the telescopic mechanism 100 includes a positioning ring 170a. The positioning ring 170a is disposed in the positioning base 161 and adjacent to the inner push block 165, and the positioning ring 170a is suitable for limiting the inner push block 165 in the positioning base 161 to prevent the inner push block 165 from protruding out of the positioning base 161. In addition, the restoring elastic member 180 is disposed in the at least one stroke tube 140 and the supporting tube 130 and pushes against the positioning base 161 and a bottom surface of the supporting tube 130 respectively.

In short, the telescopic mechanism of this embodiment utilizes the sliding positioning base to drive the balls to engage with the corresponding first positioning tube or the second positioning tube, so as to have a quick positioning function. In addition, the balls may also improve the smoothness of the movement of the positioning base in the stroke tube, thus avoiding stuck points during the movement process. In addition, the telescopic mechanism of this embodiment only needs to pull the cable to make the balls leave the positioning tube to release the engagement relation between the positioning base and the positioning tube. After the cable is released, the balls are automatically pushed back to the positioning tube through the elastic member and the inner push block, so as to engage the positioning base and the positioning tube.

In another embodiment, the at least one stroke tube 140, the at least one first positioning tube 150a and the at least one second positioning tube 150b are integrally formed, thereby increasing the structural strength of the at least one stroke tube 140, the at least one first positioning tube 150a and the at least one second positioning tube 150b. Both ends of the restoring elastic member 180 extend to the bottom tube 120 and the top tube 110 respectively. The restoring elastic member 180 is disposed around the connecting rod 164 of the control assembly 160 and pushes against the at least one first positioning tube 150a and the fixed base 163 respectively.

In the initial state, the restoring elastic member 180 pushes the at least one stroke tube 140, the at least one first positioning tube 150a and the at least one second positioning tube 150b to move relative to the protrusion 170 and the positioning base 161, so that the positioning base 161 is engaged with the at least one first positioning tube 150a or the at least one second positioning tube 150b.

Under the condition that the restoring elastic member 180 fully releases the elastic force, the top tube 110 is stretched to a maximum length relative to the bottom tube 120. When the top tube 110 shrinks to a minimum length relative to the bottom tube 120, the restoring elastic member 180 is pressed by the at least one first positioning tube 150a to accumulate elastic force.

To sum up, the telescopic mechanism of the present disclosure combines the control assembly, the at least one stroke tube, the first positioning tube and the second positioning tube, and the control assembly is suitable for moving in the at least one stroke tube to engage with the first positioning tube or the second positioning tube, thereby adjusting the telescopic length of the top tube relative to the bottom tube. Since the control assembly may only be engaged with the first positioning tube or the second positioning tube, it is possible to ensure that the telescopic mechanism is able to be accurately switched between the first length and the second length, so as to avoid errors in the adjustment process, and further reduce the cost.

Furthermore, the telescopic mechanism of the present disclosure is suitable for the seat of a bicycle, which is switched to the first length in the riding mode to raise the height of seat, and switched to the second length in the parking mode to lower the height of seat. Furthermore, multiple stroke tubes and multiple positioning tubes may be configured to obtain more adjustment positions for adjusting the height of seat.

What is claimed is:

1. A telescopic mechanism, comprising:
a top tube;
a bottom tube, slidably disposed around the top tube;
a supporting tube, disposed in the top tube;
at least one stroke tube, disposed in the top tube and spaced part from the supporting tube;
at least one first positioning tube, disposed in the top tube and abutting against one end of the at least one stroke tube;
at least one second positioning tube, disposed in the top tube and abutting against the other end of the at least one stroke tube; and
a control assembly, connected to the bottom tube and having a positioning base, wherein the positioning base is movably disposed in the at least one stroke tube, the at least one first positioning tube, and the at least one second positioning tube,
wherein when the positioning base is fastened with the at least one first positioning tube, the top tube is moved toward a first direction relative to the bottom tube to form a first length, when the positioning base is fastened with the at least one second positioning tube, the top tube is moved toward a second direction opposite to the first direction relative to the bottom tube to form a second length,
a protrusion and a restoring elastic member, wherein the protrusion is fixed on the positioning base and faces the supporting tube, and the restoring elastic member is disposed in the at least one stroke tube and the supporting tube and pushes against the protrusion and a bottom surface the supporting tube respectively.

2. The telescopic mechanism according to claim 1, wherein the control assembly comprises:
a plurality of balls, movably disposed in a plurality of holes of the positioning base;
a fixed base, engaged with one end of the bottom tube opposite to the top tube;
a connecting rod, having a first end and a second end, wherein the first end is connected to the fixed base, and the second end is connected to the positioning base;
an inner push block, movably disposed in the positioning base and contacting the plurality of balls; and
a cable, movably disposed on the positioning base and the connecting rod and engaged with the inner push block; and
an elastic member, disposed on the positioning base and surrounding the connecting rod and the cable, wherein both ends of the elastic member abut against the positioning base and the inner push block respectively.

3. The telescopic mechanism according to claim 2, wherein the inner push block has a supporting surface, an annular groove and a guiding surface, the annular groove is formed on a periphery of the inner push block and adjacent to the supporting surface, and the guiding surface is formed between the annular groove and the supporting surface.

4. The telescopic mechanism according claim 3, wherein the elastic member is adapted to push the inner push block to move toward the first direction relative to the positioning base, and the supporting surface of the inner push block is aligned with the plurality of holes to limit the plurality of balls between the at least one first positioning tube or the at least one second positioning tube and the plurality of holes.

5. The telescopic mechanism according to claim 4, wherein the at least one first positioning tube has a plurality of first positioning grooves and the at least one second positioning tube has a plurality of second positioning grooves, the plurality of balls are partially entered the plurality of first positioning grooves or the plurality of second positioning grooves, so that the positioning base is engaged with the at least one first positioning tube or the at least one second positioning tube.

6. The telescopic mechanism according to claim 3, wherein the cable is adapted to drive the inner push block to move toward the second direction relative to the positioning base, and the annular groove of the inner push block is aligned with the plurality of holes, so that the plurality of balls are partially entered the annular groove and detaching from the at least one first positioning tube or the at least on second positioning tube.

7. The telescopic mechanism according to claim 6, wherein the positioning base is adapted to move relatively along the at least one stroke tube.

8. The telescopic mechanism according to claim 1, wherein in an initial state, the restoring elastic member pushes the protrusion and the positioning base to move toward the second direction relative to the at least one stroke tube, so that the positioning base is engaged with the at least one first positioning tube or the at least one second positioning tube.

9. The telescopic mechanism according to claim 2, further comprising a positioning ring and a restoring elastic member, wherein the positioning ring is disposed in the positioning base and adjacent to the inner push block, and the restoring elastic member is disposed in the at least one stroke tube and the supporting tube and pushes against the positioning base and a bottom surface of the supporting tube respectively.

10. The telescopic mechanism according to claim 1, wherein the top tube has a connecting base disposed at one end of the top tube away from the bottom tube.

11. The telescopic mechanism according to claim 1, wherein the at least one stroke tube, the at least one first positioning tube and the at least one second positioning tube are integrally formed.

12. The telescopic mechanism according to claim 11, wherein both ends of the restoring elastic member extend to the bottom tube and the top tube respectively, and the restoring elastic member is disposed around the control assembly and pushes against the at least one first positioning tube and a fixed base respectively.

* * * * *